US008272736B2

(12) United States Patent
Lacan et al.

(10) Patent No.: US 8,272,736 B2
(45) Date of Patent: Sep. 25, 2012

(54) LENS APT TO TRIMMING

(75) Inventors: Pascale Lacan, Paris (FR); Dominique Conte, Saint-Dizier (FR)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 791 days.

(21) Appl. No.: 12/341,167

(22) Filed: Dec. 22, 2008

(65) Prior Publication Data

US 2009/0174862 A1 Jul. 9, 2009

Related U.S. Application Data

(63) Continuation-in-part of application No. 10/524,206, filed as application No. PCT/EP03/07046 on Jul. 2, 2003, now Pat. No. 7,488,509.

(30) Foreign Application Priority Data

Jun. 13, 2003 (FR) ...................................... 03 50216

(51) Int. Cl.
*G02C 7/02* (2006.01)
(52) U.S. Cl. .......... 351/166; 264/2.7; 351/178; 427/162
(58) Field of Classification Search .................. 351/166, 351/177, 178; 427/162, 154, 155, 407.1, 427/164; 264/1.1, 2.7, 1.7
See application file for complete search history.

(56) References Cited

U.S. PATENT DOCUMENTS

| 2,392,768 A | 1/1946 | Ryan .............................. 428/436 |
| 2,536,075 A | 1/1951 | MacNutt ......................... 134/28 |
| 2,628,921 A | 2/1953 | Weinrich ......................... 117/62 |
| 4,085,248 A | 4/1978 | Zehender et al. ............. 428/336 |
| 4,387,960 A | 6/1983 | Tani ............................... 359/588 |
| 4,826,548 A | 5/1989 | Herbin et al. .................. 156/152 |
| 4,959,118 A | 9/1990 | Herbin et al. .................. 156/512 |
| 5,211,759 A | 5/1993 | Zimmermann et al. ....... 118/723 |
| 5,328,768 A | 7/1994 | Goodwin ....................... 428/428 |
| 5,451,281 A * | 9/1995 | Lipman .......................... 156/154 |
| 5,582,907 A | 12/1996 | Pall ............................... 442/351 |
| 5,680,013 A | 10/1997 | Dornfest et al. .......... 315/111.21 |
| 5,792,537 A | 8/1998 | Ohlin, Jr. ......................... 428/45 |
| 5,800,918 A | 9/1998 | Chartier et al. ............... 428/336 |
| 5,919,563 A | 7/1999 | Parish, Jr. et al. ............. 428/354 |

(Continued)

FOREIGN PATENT DOCUMENTS

EP     0 614 957     3/1994

(Continued)

OTHER PUBLICATIONS

Database WPI, Section CH, Week 198819, Derwent Publications Ltd., London, GB, XP002214922, 1987.

(Continued)

*Primary Examiner* — Mathieu D. Vargot
(74) *Attorney, Agent, or Firm* — Fulbright & Jaworski L.L.P.

(57) ABSTRACT

A method for treating an ophthalmic lens comprising two main sides, wherein at least one side comprises an organic or mineral external layer coated with a $MgF_2$ temporary protective layer, said method comprising the specific treating step of depositing the $MgF_2$ temporary protective layer on the external layer through vacuum evaporation at a speed lower than or equal to 0.5 nm/s. The lens obtained from the above method is capable of being submitted to a trimming operation within 48 hours after the ophthalmic lens has been treated, i.e. after the various layers have been deposited.

11 Claims, 1 Drawing Sheet

U.S. PATENT DOCUMENTS

| | | | |
|---|---|---|---|
| 5,922,787 A | 7/1999 | Kondo et al. | 523/122 |
| 5,945,462 A | 8/1999 | Salamon | 522/37 |
| 5,972,517 A | 10/1999 | Kondo et al. | 428/446 |
| 6,143,143 A | 11/2000 | Walls et al. | 204/192.26 |
| 6,143,358 A * | 11/2000 | Singh et al. | 427/162 |
| 6,149,750 A | 11/2000 | Parish, Jr. et al. | 156/154 |
| 6,183,872 B1 | 2/2001 | Tanaka et al. | 428/429 |
| 6,277,485 B1 | 8/2001 | Invie et al. | 428/336 |
| 6,364,823 B1 | 4/2002 | Garibaldi et al. | 600/12 |
| 6,413,413 B1 | 7/2002 | Smith, Jr. | 208/213 |
| 6,491,981 B1 | 12/2002 | Guichard et al. | 428/387 |
| 6,682,773 B2 | 1/2004 | Medwick et al. | 427/154 |
| 6,863,965 B2 | 3/2005 | Fujinawa et al. | 428/215 |
| 6,884,432 B2 | 4/2005 | Yaszemski et al. | 424/460 |
| 6,887,402 B2 | 5/2005 | Klemm et al. | 264/1.24 |
| 6,921,579 B2 | 7/2005 | O'Shaughnessy et al. | 428/428 |
| 7,488,509 B2 | 2/2009 | Lacan et al. | 427/162 |
| 2003/0049370 A1 | 3/2003 | Lacan et al. | 427/154 |
| 2003/0059623 A1 | 3/2003 | O'Shaughnessy et al. | 428/428 |
| 2005/0115923 A1 | 6/2005 | Lacan et al. | 216/26 |
| 2007/0141358 A1 | 6/2007 | Jallouli et al. | 428/426 |
| 2007/0183056 A1 | 8/2007 | Conte et al. | 359/642 |
| 2008/0117382 A1 | 5/2008 | Lacan et al. | 351/159 |

FOREIGN PATENT DOCUMENTS

| | | |
|---|---|---|
| EP | 1 300 433 | 4/2003 |
| FR | 2613275 | 3/1987 |
| FR | 2824821 | 11/2002 |
| FR | 2856056 | 6/2003 |
| JP | 60135167 | 7/1985 |
| JP | 09258003 | 10/1997 |
| JP | 2004-122238 | 4/2004 |
| JP | 2004-148444 | 5/2004 |
| WO | WO 97/10923 | 3/1997 |
| WO | WO 00/68326 | 11/2000 |
| WO | WO 01/02496 | 1/2001 |
| WO | WO 02/092524 | 11/2002 |
| WO | WO 03/006704 | 1/2003 |
| WO | WO 03/057641 | 7/2003 |
| WO | WO 2005/012955 | 2/2005 |
| WO | WO 2005/015270 | 2/2005 |
| WO | WO 2006/092002 | 9/2006 |

OTHER PUBLICATIONS

Gutowski, "The relationship between strength of an adhesive bond and the thermodynamic properties of its components," *Int. J. Adhesion and Adhesives*, 7:189-198, 1987.

Kimm Institute Report regarding 3M™ surface Saver™ films.

March, *Advanced Organic Chemistry*, 4th ed., John Wiley & Sons, publishers, 1992.

Office Action issued in U.S. Appl. No. 10/147,560, mailed Oct. 10, 2008.

Office Action issued in U.S. Appl. No. 10/147,560, mailed Apr. 16, 2008.

Office Action issued in U.S. Appl. No. 10/147,560, mailed Dec. 17, 2007.

Office Action issued in U.S. Appl. No. 10/147,560, mailed Jun. 1, 2007.

Office Action issued in U.S. Appl. No. 10/147,560, mailed Oct. 13, 2006.

Office Action issued in U.S. Appl. No. 10/147,560, mailed Mar. 7, 2006.

Office Action issued in U.S. Appl. No. 10/147,560, mailed Jul. 5, 2005.

Office Action issued in U.S. Appl. No. 10/147,560, mailed Feb. 17, 2005.

Office Action issued in U.S. Appl. No. 10/147,560, mailed Aug. 18, 2004.

Office Action issued in U.S. Appl. No. 10/147,560, mailed Mar. 16, 2004.

Office Action issued in U.S. Appl. No. 10/147,560, mailed Jan. 8, 2004.

Office Action issued in U.S. Appl. No. 10/524,206, mailed Apr. 3, 2008.

Office Action issued in U.S. Appl. No. 10/524,206, mailed Aug. 14, 2007.

Office Action issued in U.S. Appl. No. 10/524,206, mailed Feb. 13, 2007.

Owens et al., "Estimation of the surface free energy of polymers," *J. Appl. Polym. Sci.*, 13:1741-1747, 1969.

Sobieski and Tangney., *Handbook of Pressure-Sensitive Adhesive Technology*, 2nd Ed., D. Satas, ed., Van Nostrand Reinhold, New York, pp. 508-517, 1989.

Definition of "Silane", Merriam-Webster's Collegiate Dictionary, tenth edition, 1998.

Office Action issued in U.S. Appl. No. 10/147,560, mailed Dec. 11, 2009.

Office Action issued in U.S. Appl. No. 10/147,560, mailed May 1, 2009.

* cited by examiner

LENS APT TO TRIMMING

CROSS REFERENCES TO RELATED APPLICATIONS

This application is a continuation-in-part of U.S. application Ser. No. 10/524,206, filed Feb. 10, 2005, which is a national phase application under 35 U.S.C. §371 of PCT Application No. PCT/EP2003/007046 filed Jul. 2, 2003, which claims priority to French Application No. 03/50216 filed Jun. 13, 2003. The contents of these application are incorporated by reference.

BACKGROUND OF THE INVENTION

The present invention relates to the field of trimming lenses, more particularly ophthalmic lenses.

An ophthalmic lens results from a succession of moulding and/or surfacing/smoothing operations determining the geometry of both convex and concave optical surfaces of said lens, followed by appropriate surface treatments The last finishing step of an ophthalmic lens is the trimming operation consisting in machining the edge or the periphery of the glass so as to shape it according to the required dimensions to adapt the lens to the glass frame wherein it is to be arranged.

Trimming is generally done on a grinding machine comprising diamond wheels that perform the machining step as defined hereinabove.

The lens is held, upon such an operation, by axially acting blocking members.

The relative motion of the lens with respect to the grinding wheel is monitored, generally digitally, so as to provide the desired shape.

As it appears, it is mostly imperative that the lens be firmly maintained upon such a movement.

To this end, before the trimming operation, an acorn-forming step is performed on the lens, i.e. a holding means or acorn is positioned on the convex surface of the lens.

A holding pad, such a self-adhesive chip, for example a two-sided adhesive, is arranged between the acorn and the convex surface of the lens.

The so arranged lens is positioned on one of the above-mentioned axial blocking members, the second axial blocking member clamping then the lens on the concave surface thereof by means of an abutment, generally consisting in an elastomer.

Upon the machining step, a tangential torque effort is generated on the lens, which may result in a rotation of the lens relative to the acorn if the lens holding means is not sufficiently efficient.

The good holding of the lens mainly depends on the good adhesion at the interface of holding pad/convex surface of the lens.

The last generation ophthalmic lenses most often comprise an organic or mineral external layer modifying the surface energy, for example antistain hydrophobic and/or oilophobic coatings.

These are most often materials of the fluorosilane type reducing the surface energy so as to avoid the adhesion of fatty stains, which are thus easier to be removed.

Such a surface coating type may be of such an efficiency that the adhesion at the pad/convex surface interface can be thereby altered, making difficult satisfactory trimming operations, in particular for polycarbonate lenses the trimming of which generates much more large efforts in comparison with other materials.

The consequence of a badly performed trimming operation is the pure and simple loss of the lens.

That is why it is advantageous to deposit on the external layer a temporary protective layer imparting a surface energy at least equal to 15 $mJ/m^2$, in particular a $MgF_2$ protective layer, such as disclosed in the French Patent Application no. 0106534.

Such a method is globally satisfactory, but can be further improved. Indeed, trimming lenses having their external layer coated with a temporary $MgF_2$ protective layer is often successfully possible only 48 hours after the lens treatment i.e. after the various layers have been deposited, in particular after the external layer and the protective layer have been deposited. When such lenses are trimmed in a period of time of less than 48 hours, the acorn-holding pad system tends to detach itself from the lens spontaneously or under a very weak effort. This is the "acorn-removing" phenomenon. Practically, this occurs when the lens is removed from the grinding machine.

SUMMARY OF THE INVENTION

One of the objects of the invention has therefore the aim to provide a method for treating a lens comprising an organic or mineral external layer, in particular an hydrophobic and/or oilophobic layer, coated with a $MgF_2$ temporary protective layer, enabling to perform the trimming operation very quickly after the various layers have been deposited on the lens, for example, after one hour.

To this end, the invention relates to a method for treating an ophthalmic lens comprising two main sides, wherein at least one side comprises an organic or mineral external layer coated with a $MgF_2$ temporary protective layer, the method comprising a specific treatment step selected amongst the following steps:

a liquid phase chemical treatment of the temporary protective layer, leading to the formation of MgO and/or $Mg(OH)_2$ in and/or on the temporary protective layer, a deposit of at least one non fluorinated metallic oxide and/or of at least one non fluorinated metallic hydroxide on the temporary protective layer through transfer thereof from an electrostatic film or through vacuum evaporation thereof directly on the temporary protective layer, the deposit of the $MgF_2$ temporary protective layer on the external layer is performed through vacuum evaporation at a speed lower than 0.5 nm/s, preferably lower than or equal to 0.3 nm/s.

Preferably, the metallic oxide is selected amongst calcium or magnesium oxide, praseodymium oxide, cerium oxide or a mixture of two or more of such oxides.

Preferably, the metallic hydroxide is the magnesium hydroxide.

The external layer is preferably a hydrophobic and/or oilophobic surface coating and, in particular, a hydrophobic and/or oilophobic surface coating deposited on a mono- or multilayered non reflecting coating.

As previously indicated, the hydrophobic and/or oilophobic coatings are obtained through application, on the non reflecting coating surface, of compounds reducing the lens surface energy.

Such compounds have been widely disclosed in the previous art, for example in U.S. Pat. No. 4,410,563, EP-0203730, EP-749021, EP-844265, EP-933377.

Silane-based compounds bearing fluorinated groups, in particular perfluorocarbone or perfluoropolyether group(s), are most often used.

By way of examples, silazane, polysilazane or silicone compounds are to be mentioned, comprising one or more fluorinated groups such as those mentioned hereabove.

A known method consists in depositing on the non reflecting coating compounds bearing fluorinated groups and Si—R groups, R representing an —OH group or a precursor thereof, preferably an alkoxy group. Such compounds may perform, at the non reflecting coating surface, directly or after hydrolysis, polymerisation and/or cross-linking reactions.

Applying compounds reducing the lens surface energy conventionally occurs by dipping in a solution of said compound, centrifugation or vapour phase depositing, amongst others. Generally, the hydrophobic and/or oilophobic coating has a thickness lower than 30 nm, preferably ranging from 1 to 20 nm, more preferably ranging from 1 to 10 nm.

The invention is preferably carried out with lenses comprising a hydrophobic and/or oilophobic surface coating imparting a surface energy lower than 14 mJoules/m$^2$ and more preferably lower than or equal to 12 mJ/m$^2$ (the surface energies being calculated according to the Owens-Wendt method disclosed in the following reference: "Estimation of the surface force energy of polymers" Owens D. K., Wendt R. G. (1969), J. APPL. POLYM. SCI, 13, 1741-1747).

The MgF$_2$ temporary protective layer is deposited directly on the external layer.

The protective layer may be deposited using any appropriate conventional method, in vapour phase (vacuum deposit), or in liquid phase, for example, through vaporization, centrifugation or dipping.

Generally, non reflecting hydrophobic and/or oilophobic coatings have been deposited by evaporation in vacuum caps and it is desirable to deposit the temporary protective layer with the same method, making it possible to perform all the operations successively, with no excessive handling of the lenses between the steps.

Another advantage of the vacuum deposit is to avoid any wettability problem in the case where the thin layer onto which the protective layer has just been deposited shows hydrophobic and/or oilophobic properties.

Generally speaking, the temporary protective layer should have a satisfactory thickness so as to avoid any subsequent alteration of the external layer properties during the various treating steps of the lens.

Preferably, its thickness ranges from 5 to 50 nm.

The MgF$_2$ temporary protective layer will increase the lens surface energy up to a value of at least 15 mJoules/m$^2$.

It can be applied on an area covering the whole of at least one of the two sides of the lens or only on the area adapted to accommodate the contact of the holding pad of said lens.

More precisely, it is usual to deposit the holding pad, associated with the acorn, on the lens convex side. It is therefore possible to cover with the protective layer the whole convex side or, alternatively, only a central area of the convex side, using a mask or any other appropriate technique.

Moreover, the lenses having a MgF$_2$ temporary protective layer may be subjected to markings using various inks, commonly used by the man of the art for progressive lenses.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented below.

DESCRIPTION OF ILLUSTRATIVE EMBODIMENTS

Figure 1:
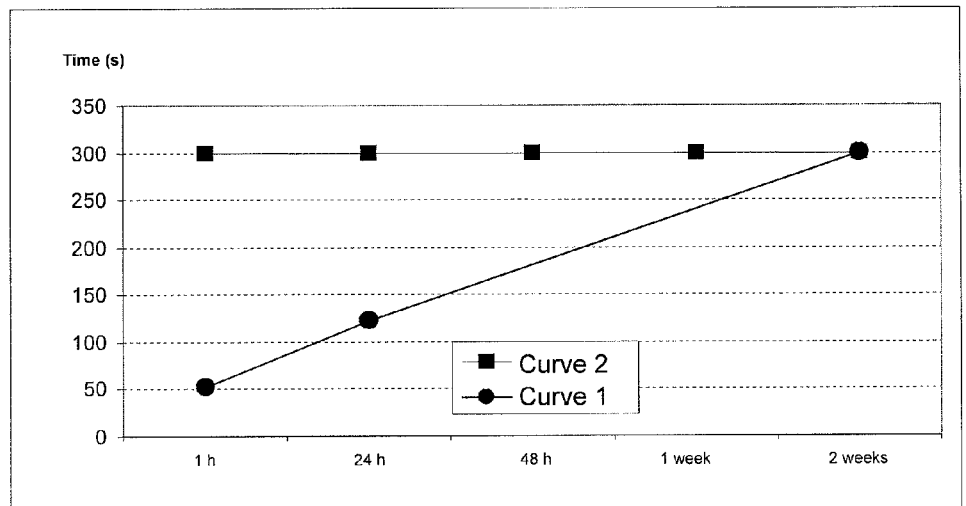
FIG. 1. Curve 1 illustrates a lens which has not been subjected to a specific treatment step. Curve 2 illustrates a lens which has been subjected to a specific treatment step by a sodium hypochlorite aqueous solution.

As previously described, the method according to the invention comprises a specific treating step.

When the specific treating step according to the invention is a liquid phase chemical treatment of the temporary protective layer, such a liquid phase chemical treatment can be performed using several embodiments.

According to a first preferred embodiment, the liquid phase chemical treatment comprises a step of contacting the MgF$_2$ temporary protective layer with non distilled non deionised water (for example tap water) at a temperature from 30 to 50° C., preferably from 30 to 40° C.

According to a second preferred embodiment, the liquid phase chemical treatment comprises a step of contacting the MgF$_2$ temporary protective layer with a soda aqueous solution.

During the contact step, the aqueous solution temperature advantageously ranges from 14 to 40° C., and more preferably from 14 to 20° C.

Preferably, the soda molar concentration of the solution ranges from 0.01 to 0.1 mol/liter and preferably in the order of 0.02 mol/liter.

According to a third preferred embodiment, the liquid phase chemical treatment comprises a step of contacting the MgF$_2$ temporary protective layer with a sodium hypochlorite aqueous solution.

As previously, the aqueous solution temperature advantageously ranges from 14 to 40° C., and preferably from 14 to 20° C.

Preferably, the sodium hypochlorite solution has a chlorometric degree from 0.1 to 5, preferably in the order of 1.

Generally, in the three previously described embodiments, the step of contacting the MgF$_2$ temporary protective layer with non distilled non deionised water, or with the soda aqueous solution or the sodium hypochlorite occurs during a period of time at least equal to 10 seconds, preferably in the order of 15 seconds.

Moreover, preferably, the liquid phase chemical treatment subsequently comprises a water rinsing step, preferably using deionised or distilled water, and a drying step, for example, through air blowing.

As previously stated, the specific treating step according to the invention may also consist in depositing at least one non fluorinated metallic oxide and/or at least one non fluorinated metallic hydroxide on the temporary protective layer.

Preferably, a MgO deposit is carried out. The depositing technique will be described in the case of MgO. Nevertheless, the mentioned techniques and thicknesses also apply to other non fluorinated metallic oxides and metallic hydroxides on the temporary protective layer. MgO depositing may be performed according to two preferred embodiments.

According to a first preferred embodiment, MgO depositing is made by transfer and comprises the following steps of:

vacuum evaporating MgO on an electrostatic film, depositing the electrostatic film onto the lens side coated with the $MgF_2$ temporary protective layer, removing the electrostatic film, MgO remaining on $MgF_2$.

The electrostatic film removal is generally performed just before trimming. Thus, between the film depositing and its removal, the film, in addition to the fact that it allows the MgO to be transferred onto the temporary protective layer, also makes it possible to ensure the protection of the temporary protective layer when the lens is being stored or transported.

According to a second preferred embodiment, MgO depositing onto the temporary protective layer occurs through vacuum evaporation, the shaped MgO layer having a thickness ranging from 1 to 5 nm.

The evaporated MgO can result, for example, from an evaporation from:

MgO granules, with a granulometry ranging from 1 to 3 mm (ref.: M-1131 from CERAC);

MgO granules, with a granulometry ranging from 3 to 6 mm (ref.: M-2013 from UMICORE);

MgO pellets, (ref.: 0481263 commercialized by UMICORE corporation).

When $Mg(OH)_2$ is evaporated, it can be advantageously obtained from ALDRICH.

Generally, MgO depositing occurs after the $MgF_2$ deposit. Thus, two distinct $MgF_2$/MgO layers are achieved. This can be, if necessary, followed with part of the $MgF_2$ evaporation, starting with the MgO evaporation, so that there is then a gradient the composition of which varies from pure $MgF_2$ to pure MgO at the surface.

Finally, as previously stated, the specific treating step can also consist in slowing down the $MgF_2$ temporary protective layer on the external layer. Usually, such a type of deposit is performed at a speed of about 0.5 nm/s. According to the invention, depositing the protective layer through vacuum evaporation is performed at a speed lower than 0.5 nm/s, preferably about 0.1 nm/s.

As previously indicated, the lenses treated with the method according to the invention comprise two main sides, one of which comprises an external layer coated with a temporary $MgF_2$ protective layer.

According to a preferred embodiment, the two main sides comprise an external layer coated with a $MgF_2$ temporary protective layer. Generally, the first side on which the various layers are deposited is the concave side. The $MgF_2$ layer then makes it possible to protect such a side while the second side is being treated.

When both main sides comprise an external layer covered with a $MgF_2$ protective layer, the specific treating step according to the invention is preferably carried out on each of the main sides.

After the various treating operations of the lens, in particular after the lens has been trimmed, the temporary protective layer is removed.

The removal step of the temporary protective layer can be carried out either in a liquid medium, or through a mechanical action, such as friction, dry wiping, or through by implementation of those two means.

At the end of the step of removing the temporary protective layer, the lens exhibits optical and surface features of the same order, even nearly identical to those of the initial lens, comprising the hydrophobic and/or oilophobic coating.

The present invention also relates to an ophthalmic lens comprising a hydrophobic and/or oilophobic coating, a $MgF_2$ temporary protective layer, deposited on said hydrophobic and/or oilophobic coating, characterized in that a layer of at least one non fluorinated metallic oxide and/or at least one non fluorinated metallic hydroxide is deposited on the $MgF_2$ protective layer.

The non fluorinated metallic oxides and hydroxides are preferably selected amongst those previously described, and more particularly, the non fluorinated metallic hydroxide is magnesium hydroxide.

The hydrophobic and/or oilophobic coating is such as previously defined and the external layer is preferably deposited on a non reflecting coating, in particular multilayered.

The invention also relates to an ophthalmic lens such as hereinabove defined comprising an easily detachable electrostatic film covering the non fluorinated metallic oxide and/or hydroxide layer as previously described.

Preferably, the layer coated with the electrostatic film is a MgO layer.

Figure 2:
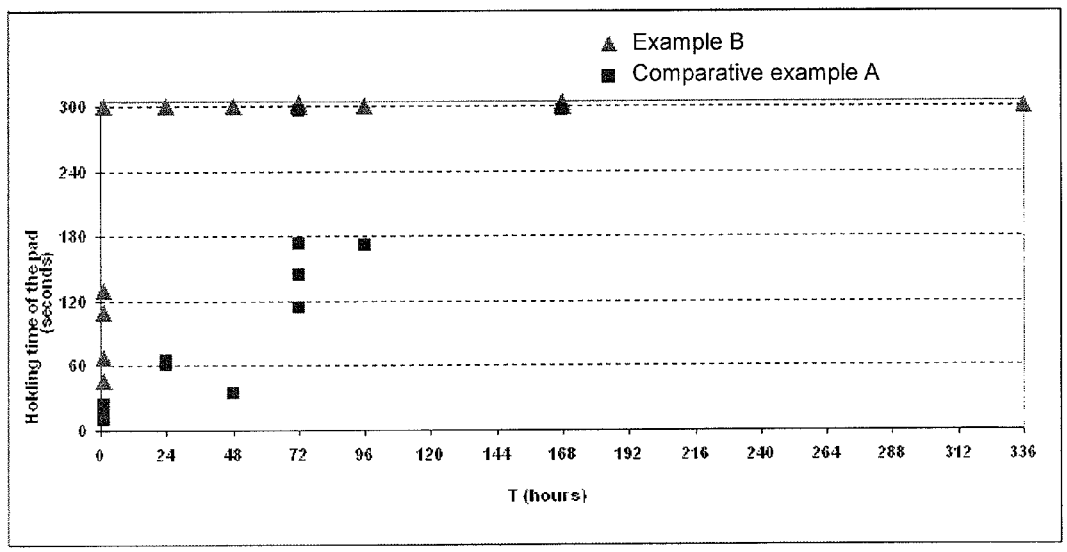
FIG. 2. The abscissa represents the time T elapsed since the end of the lens treatment (expressed in hours), and the ordinate represents the holding time of the pad under the water jet (expressed in seconds).

The present invention is illustrated by the following examples, referring in particular to FIGS. 1 and 2, representing the holding time of a pad glued to a lens under water jet, as a function of the time elapsed from the deposit of the external layer and the protective layer.

EXAMPLES

Example 1

The aim is to test the specific treating effect according to the invention upon the lens trimming operation, in particular on the acorn-removing phenomenon.

The deposits are achieved on substrates which are CR39® based ophthalmic lenses comprising, on both sides, an anti-abrasion coating of the polysiloxane type corresponding to example 3 in the Patent Application EP 614957. The lenses are washed in an ultra-sound cleaning vessel, steamed for 3 hours minimum at a temperature at 100° C. They are then ready to be treated. The treated lenses are round lenses.

1. Preparation of the Lenses 1.1 Preparation of the Lenses Having a Non Reflecting and Hydrophobic/Oilophobic Coating The vacuum treating machine used is a Balzers BAK760 machine provided with an electron gun, an ion gun of the "end-Hall" Mark2 Commonwealth type and an evaporation source with a Joule effect.

The lenses are placed on a carrousel provided with circular openings intended to accommodate the lenses to be treated, the concave side facing the evaporation sources and the ion gun.

A vacuum drawing is performed until a secondary vacuum is reached.

Then, a successive evaporation is performed, with the electron gun, of 4 non reflecting optical layers, high index (IH), low index (BI), HI, BI:$ZrO_2$, $SiO_2$, $ZrO_2$, $SiO_2$.

Finally, a hydrophobic and oilophobic coating layer is deposited through evaporation of a product with the tradename OPTOOL DSX (compound comprising perfluoropropylene patterns) sold by DAIKIN corporation.

A given amount of Optool DSX is placed in a copper capsule with a 18 mm diameter, in turn placed in a joule effect crucible (tantalum crucible).

A 1 to 5 nm thickness of hydrophobic and oilophobic coating is deposited through evaporation.

Setting the deposited thickness is performed by means of a quartz scale.

1.2 Deposit of the Temporary Protective Layer

The protective layer is then evaporated.

The deposited material is a compound with $MgF_2$ formula, having a 1 to 2.5 nm granulometry, sold by Merck corporation.

The evaporation is performed using an electron gun.

The deposited physical thickness is 20 nm, with a deposit speed equal to 0.52 nm/s.

Setting the deposited thickness is performed by means of a quartz scale.

Subsequently, the enclosure is heated again and the treatment chamber is set back to atmosphere.

The lenses are then turned upside down and the convex side oriented towards the treatment area. The convex side is treated identically to the concave side (reproducing the steps 1.1 and 1.2 hereabove).

1.3 Specific Treatment Step

The lenses are then subjected to a specific treatment step according to the invention selected amongst the following steps:

non deionised and non distilled water
sodium hypochlorite aqueous solution
soda aqueous solution
MgO transfer from an electrostatic film
MgO evaporation directly on the temporary $MgF_2$ layer.

a) (Non Deionised and Non Distilled) Warm Water

The lenses are placed under the tap warm water, with a 40° C. temperature, for 15 seconds.

Then, they are rinsed with distilled water and blown with pressurized air.

b) Sodium Hypochlorite Aqueous Solution

The lenses are dipped for 15 seconds in a Pyrex® vessel containing 1 liter distilled water with a temperature equal to 40° C. and 20 ml of Javel extract at 48 chlorometric degrees.

Then, the lenses are rinsed with distilled water and blown with pressurized air.

c) Soda Aqueous Solution

The lenses are immerged for 15 seconds in a Pyrex® vessel containing 1 liter distilled water with a temperature equal to 40° C. and 40 ml of soda at 0.5 mol.$L^{-1}$.

Then, the lenses are rinsed with distilled water and blown with pressurized air.

d) MgO Transfer from an Electrostatic Film

With an electron gun, a MgO layer is vacuum evaporated from MgO chips (reference 0481263) from the UMICORE corporation on PVC based (polyvinylchloride) copolymer electrostatic films with a 100/μm thickness, supplied from SERICOM PLASTOREX corporation. Such films are present in the form of discs with a diameter ranging from 38 to 50 mm.

The MgO coated electrostatic films are deposited on the lens convex side.

At the trimming time, the films are removed. A MgO layer remains on the $MgF_2$ protective layer.

e) MgO Evaporation Directly on the $MgF_2$ Temporary Layer.

Using an electron gun, a MgO layer is vacuum evaporated (from MgO chips (reference 0481263) from UMICORE corporation) with a 2 nm thickness, directly on the $MgF_2$ protective layer.

2. Acorn-Removing Test 2.1 Principle

An acorn-removing test is performed under a water jet on the prepared lenses. This test is simpler and quicker to perform than trimming the lenses. It is also "harder" than the real trimming of the lenses. Nevertheless, it makes it possible to classify the results in a very discriminating way.

A double-sided 3M brand self-adhesive chip is used as a holding pad.

The pad is manually glued on the acorn.

The acorn+pad set is manually glued on the convex side of each lens.

The lens is placed under tap water (running water), the temperature of which is not monitored, for more than 5 minutes. The flow rate is 6 liter/minute. The distance between the lens and the tap nose is approximately 20 cm.

Alternatively, a hand rotation of the lens is performed, as well as a tilting operation, so that the water penetrates through the edge and also through the central hole of the acorn.

If the acorn+pad set falls before 5 minutes (corresponding to the acorn-removing phenomenon), the time is recorded during which the set has remained glued on the lens.

If after 5 minutes, the acorn+pad set has not fallen, the percentage is recorded of the pad surface remaining still glued. This is well visible through transmission looking at the lens from the concave side under neon light.

2.2 Tests and Results a) Test 1

The holding time of the acorn+pad set is measured under the water jet, as a function of the elapsed time from the end of the lens treatment, i.e. as from the deposit of the various layers and the specific treatment step.

The results are represented on FIG. 1.

The measurements are made for a lens which has not been subjected to the specific treatment step (curve 1), and for a lens having been subjected to the specific treatment step by the sodium hypochlorite aqueous solution (curve 2).

The abscissa represents the time elapsed since the end of the lens treatment. The ordinate represents the pad holding time under the water jet in seconds.

It can be seen that after one hour, the lens having been subjected to the specific treatment step reaches a pad holding time of 300 seconds, whereas it takes 2 weeks for the glass which has not been subjected to the specific treatment step to achieve the same holding time.

b) Test 2

The holding time measurements are performed for lenses which have not been subjected to a specific treatment step according to the invention and for lenses having been subjected to a specific treatment step according to the invention. The measurements are made at various times T after the end of the treatment of the lens.

The results are gathered in table 1.

TABLE 1

| Specific treatment step | ACORN-REMOVING UNDER A WATER JET | | |
| --- | --- | --- | --- |
| | T = 1 hour | 1 h < T < 2 weeks | T > 2 weeks |
| None | Acorn-removing after 10 s for 1 m under the water jet | Acorn-removing after 10 s for 5 m under the water jet | No acorn-removing after 5 m under the water jet |
| Warm tap water, or soda aqueous solution or sodium hypochlorite aqueous solution | No | No | No |
| MgO transfer | No | No | No |
| MgO evaporation | No | No | No |

The results on table 1 show that the specific treatment step according to the invention completely eliminates the acorn-removing phenomenon.

c) Test 3

In this test, the specific treatment step by the sodium hypochlorite aqueous solution such as previously described has been performed on only half of the lens surface.

Thus, the lenses have been half immerged in a Pyrex flask containing the sodium hypochlorite aqueous solution.

After approximately 15 seconds under the water jet, the pads glued on half of the lens surface which have not been subjected to the specific treatment step are completely peeled off.

After 5 minutes under the water jet, the pads glued on half of the lens surface having been subjected to the specific treatment step remain glued at 100%.

The same result is obtained in the case where the specific treatment step is performed with the soda aqueous solution.

Examples 2A (comparative), 2B and 2C

Comparative Example 2A

Lenses comprising an antireflection coating and a hydrophobic/oilophobic coating ("top coat") were prepared as described in § 1.1 of example 1. The physical thickness of the deposited top coat was 2 nm. A 20 nm thick $MgF_2$ temporary protective layer was then deposited onto said top coat as described in § 1.2 of example 1, except that the deposition speed was 0.53 nm/s instead of 0.52 nm/s.

Example 2B

Lenses were prepared as described in comparative example 2A, except that the deposition speed of the $MgF_2$ temporary protective layer was 0.10 nm/s instead of 0.53 nm/s. This step is a specific treating step according to the invention (deposition through vacuum evaporation at a speed lower than 0.5 nm/s).

Example 2C

Lenses were prepared as described in example 2B, except that the deposition speed of the $MgF_2$ temporary protective layer was 0.03 nm/s instead of 0.10 nm/s. This step is a specific treating step according to the invention (deposition through vacuum evaporation at a speed lower than 0.5 nm/s).
Test and Results The lenses of comparative example 2A and examples 2B and 2C were subjected to the acorn-removing test disclosed in § 2.1 of example 1, at various times T after the end of the lens treatment.

The results are presented on FIG. 2 (the abscissa represents the time T elapsed since the end of the lens treatment (expressed in hours), and the ordinate represents the holding time of the pad under the water jet (expressed in second).

As can be seen, the lenses of example 2B (having been subjected to a specific treatment step according to the invention) reach after roughly T=1 hour a pad holding time of 300 seconds, whereas it takes approximately two weeks (168 h) for lenses according to comparative example 2A to achieve the same holding time. The same results were obtained for examples 2B and 2C (data not shown on FIG. 2).

The invention claimed is:

1. An ophthalmic lens apt to trimming, comprising a hydrophobic and/or oilophobic coating layer and a $MgF_2$ temporary protective layer on said hydrophobic and/or oilophobic coating layer, wherein a layer of at least one non-fluorinated metallic oxide and/or at least one non-fluorinated metallic hydroxide is on the $MgF_2$ protective layer.

2. The ophthalmic lens of claim 1, wherein the metallic oxide is magnesium oxide, calcium oxide, praseodymium oxide, and/or cerium oxide.

3. The ophthalmic lens of claim 1, wherein the non-fluorinated metallic hydroxide is magnesium hydroxide.

4. The ophthalmic lens of claim 1, wherein the hydrophobic and/or oilophobic coating layer has a thickness lower than 30 nm.

5. The ophthalmic lens of claim 4, wherein the hydrophobic and/or oilophobic coating layer has a thickness ranging from 1 to 20 nm.

6. The ophthalmic lens of claim 4, wherein the hydrophobic and/or oilophobic coating layer has a thickness ranging from 1 to 10 nm.

7. The ophthalmic lens of claim 1, wherein the temporary protective layer has a thickness ranging from 5 to 50 nm.

8. The ophthalmic lens of claim 1, wherein the hydrophobic and/or oilophobic coating layer is on a non-reflecting coating.

9. The ophthalmic lens of claim 8, wherein the non-reflecting coating is multi-layered.

10. The ophthalmic lens of claim 1, further comprising an electrostatic film on the non-fluorinated metallic oxide and/or non-fluorinated metallic hydroxide layer.

11. The ophthalmic lens of claim 1, wherein the metallic oxide is magnesium oxide.

* * * * *